United States Patent
Skinner et al.

(10) Patent No.: US 6,948,372 B2
(45) Date of Patent: Sep. 27, 2005

(54) METHOD OF CONNECTION TO A SPARK PLUG PRESSURE SENSOR

(75) Inventors: Albert Anthony Skinner, Anderson, IN (US); Raymond O. Butler, Jr., Anderson, IN (US); Diane E. Hageman, Fishers, IN (US); Ronald J. Kiess, Decatur, IN (US)

(73) Assignee: Delphi Technologies, Inc., Troy, MI (US)

( * ) Notice: Subject to any disclaimer, the term of this patent is extended or adjusted under 35 U.S.C. 154(b) by 43 days.

(21) Appl. No.: 10/754,038

(22) Filed: Jan. 8, 2004

(65) Prior Publication Data

US 2005/0150301 A1      Jul. 14, 2005

(51) Int. Cl.[7] .............................. G01L 7/00; F02P 11/00
(52) U.S. Cl. ......................................... 73/714; 123/634
(58) Field of Search ............................. 73/35.07, 35.08, 73/35.12, 118.1, 714, 756; 123/634, 647, 123/169 R

(56) References Cited

U.S. PATENT DOCUMENTS 6,119,667 A  *  9/2000  Boyer et al. ................. 123/634
6,668,632 B2 * 12/2003  Ford et al. ................... 73/118.1

* cited by examiner

Primary Examiner—William Oen
(74) Attorney, Agent, or Firm—Jimmy L. Funke

(57) ABSTRACT

The present invention provides a spark plug coil and pressure sensor assembly for providing a spark to a cylinder of an internal combustion engine. The assembly comprises a spark plug configured for mounting in a cylinder and a pressure sensor associated with the spark plug configured to detect a pressure in the cylinder and generate a pressure signal in response thereto. The assembly includes a first electrically conductive ring connector configured to receive the pressure signal and a housing having a main axis and having at least one electrically conductive leaf spring member. The leaf spring member is configured to resiliently engage the first electrically conductive ring connector over a first predetermined circumferential angle relative to the main axis of the coil housing.

24 Claims, 2 Drawing Sheets

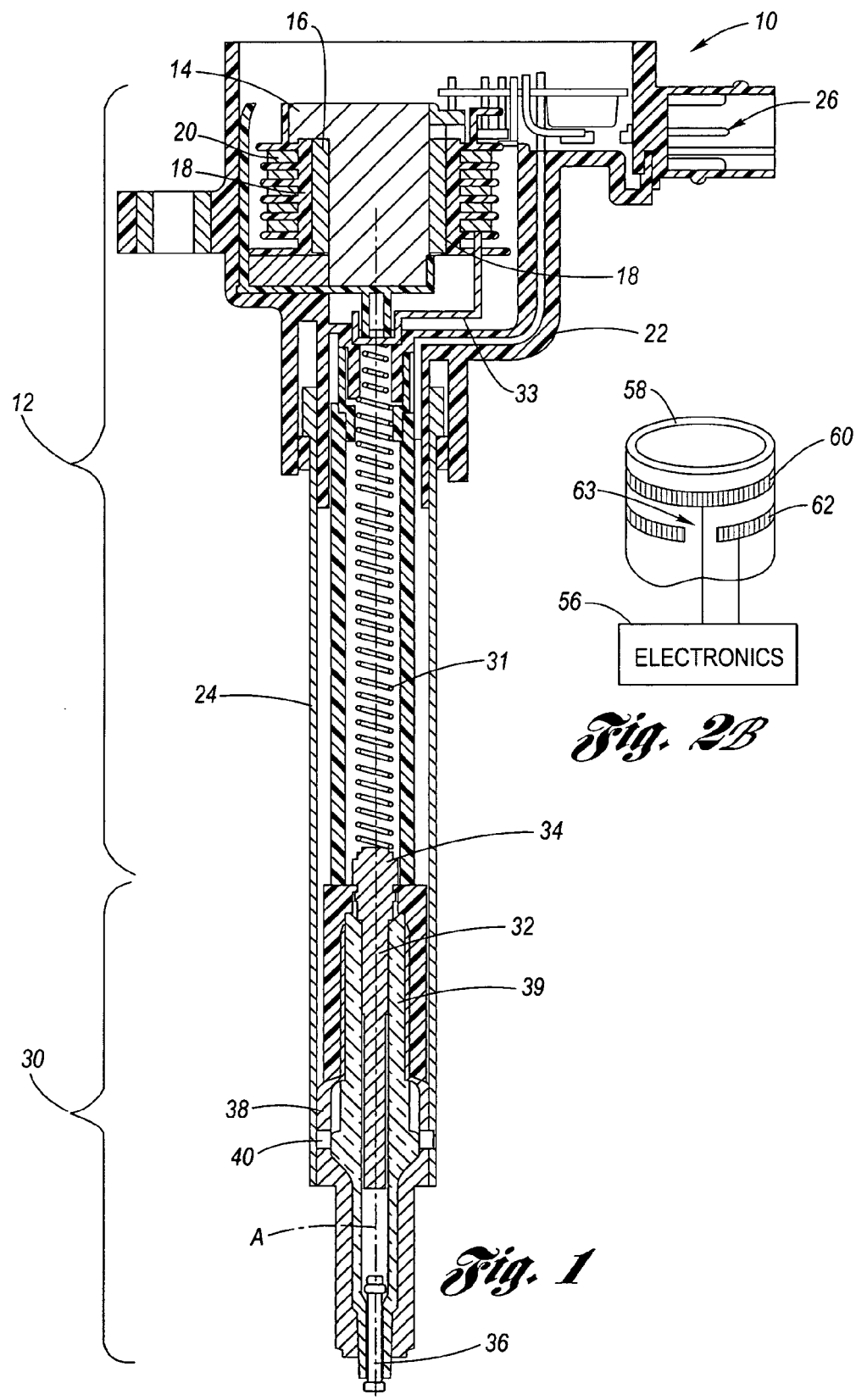

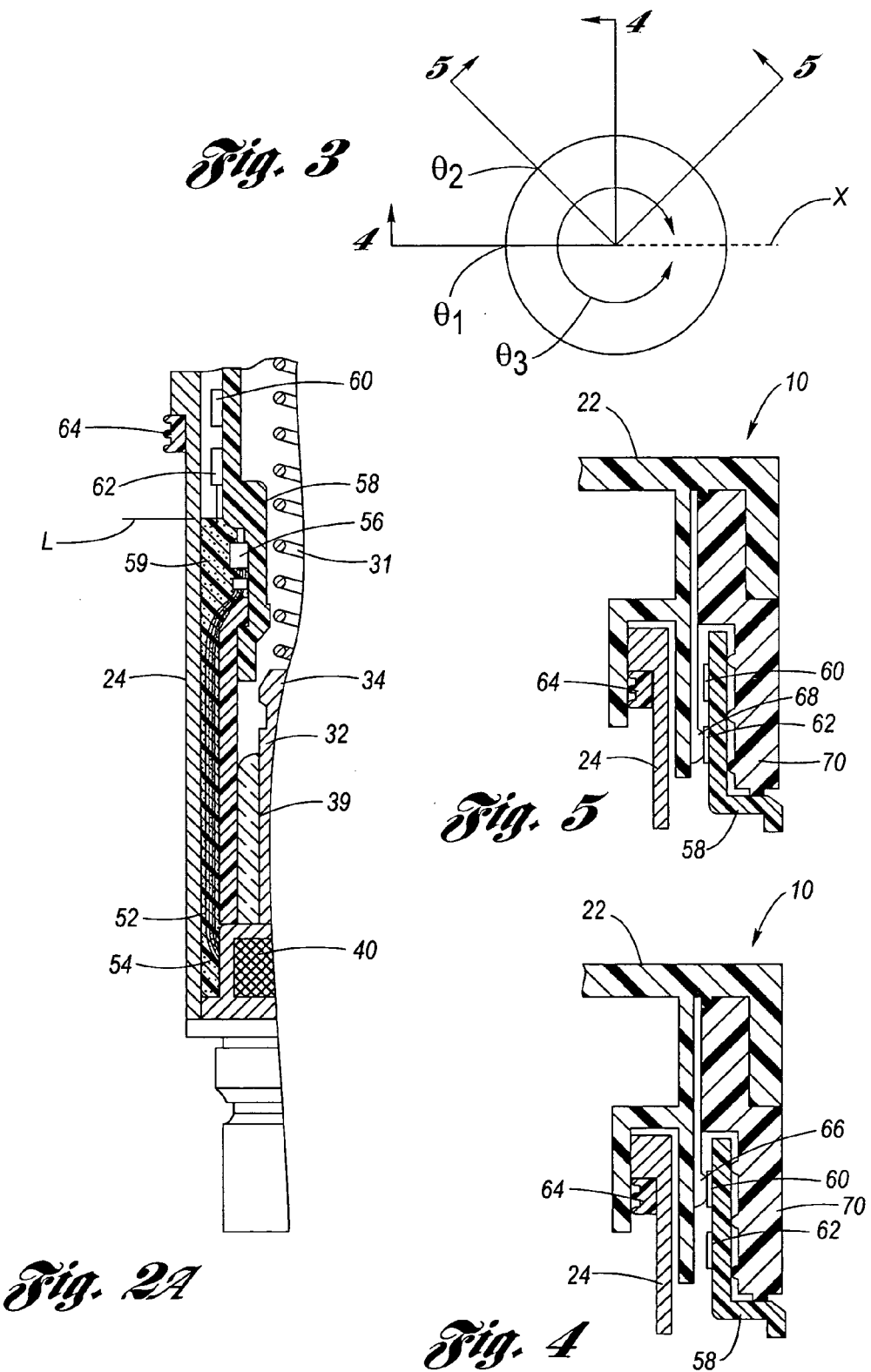

METHOD OF CONNECTION TO A SPARK PLUG PRESSURE SENSOR

TECHNICAL FIELD

The present invention relates generally to a spark plug coil and pressure sensor electrical connection assembly.

BACKGROUND OF THE INVENTION

It is well known to provide a solid electrical connection between a high voltage source and a spark plug installed in an internal combustion engine, by way of a wire or the like. These electrical connections must withstand extreme environments such as vibration and high engine temperatures. However, such conventional electrical connections generally do not accommodate a spark plug assembly when it incorporates a pressure sensor. Notwithstanding this generalization, such an assembly including a connection where a pressure sensor is present is known and disclosed in U.S. Pat. No. 6,119,667 entitled "INTEGRATED SPARK PLUG IGNITION COIL WITH PRESSURE SENSOR FOR AN INTERNAL COMBUSTION ENGINE" issued to Boyer et al.

Boyer et al. disclose an integrated spark plug/ignition coil assembly with a pressure sensor for generating a signal indicative of a cylinder pressure in a cylinder of an internal combustion engine. The disclosed approach, however, requires additional electrical wiring to connect the pressure sensor to a connector of the integrated assembly for transmission of the pressure signal to an external control. This approach does not allow the spark plug to be easily separable from the ignition coil, impairing maintenance/repair.

It would therefore be desirable to provide a reliable electrical connection interface between a pressure sensor and an external connector of the overall spark plug/ignition coil assembly. The electrical connection would allow the ignition coil portion to be separable from the spark plug/pressure sensor portion, thereby allowing for serviceability and ease of attachment of the ignition coil to the spark plug/pressure sensor portion. It would also be desirable to provide an electrical connection that can provide electrical connectivity regardless of the angular orientation of the spark plug/pressure sensor portion relative to the ignition coil portion.

There is therefore a need for an electrical connection system that overcomes one or more of the problems set forth above.

SUMMARY OF THE INVENTION

An object of the present invention is to solve one or more of the problems set forth in the Background. An advantage of an electrical connection assembly according to the present invention is that it provides a readily separable/connectable structures configured for electrical conductivity. Another advantage is that it allows for a high degree of variation, relative to the angular alignment between the ignition coil portion and the spark plug/pressure sensor portion. A spark plug coil and pressure sensor assembly is provided for generating a spark to a cylinder of an internal combustion engine. The assembly includes a spark plug configured for mounting in a cylinder and a pressure sensor associated with the spark plug configured to detect a pressure in the cylinder and generate a pressure signal in response thereto. The assembly further includes a first electrically conductive ring connector configured to receive the pressure signal. The assembly still further includes a coil housing having a main axis having at least one electrically conductive leaf spring member. The leaf spring member is configured to resiliently engage the first electrically conductive ring connector over a first predetermined circumferential angle relative to the main longitudinal axis. The leaf spring is further configured, in one embodiment, for connection through the housing to an interface of the assembly. The interface may allow for conduction of the pressure signal to a main control.

A glow plug embodiment is also presented.

BRIEF DESCRIPTION OF THE DRAWINGS

The present invention will now be described by way of example, with reference to the accompanying drawings.

FIG. 1 is a sectional view of a spark plug/ignition coil and pressure sensor assembly according to the present invention.

FIG. 2A is an enlarged view of the spark plug/ignition coil and pressure sensor assembly of FIG. 1.

FIG. 2B is an enlarged perspective view of the first and second ring connectors of FIG. 2A.

FIG. 3 is a top view of the assembly.

FIG. 4 is an enlarged section view of the assembly of FIG. 1 taken substantially along lines 4—4 in FIG. 3.

FIG. 5 is an enlarged section view of the assembly of FIG. 1 taken substantially along lines 5—5 in FIG. 3.

DETAILED DESCRIPTION OF THE PREFERRED EMBODIMENTS

Referring now to the drawings wherein like reference numerals are used to identify identical components in the various views, FIG. 1 illustrates a spark plug/ignition coil and pressure sensor assembly 10 having a connection feature in accordance with the present invention. Assembly 10 is configured to include a pressure sensor affixed to or in close proximity to a spark plug portion thereof.

FIG. 1 is a simplified, sectional view of an assembly 10. Assembly 10 may be used for electrical energy delivery to an internal combustion engine, such as a spark-ignited internal combustion engine, or a diesel cycle internal combustion engine (e.g., a glow plug). In the illustrated embodiment, assembly 10 is configured to provide a spark to a cylinder of an internal combustion engine (engine not shown).

With continued reference to FIG. 1, assembly 10 is generally elongated, having a main axis designated "A." Assembly 10 includes a transformer 12 and a spark plug 30.

Transformer 12 is configured as a step-up transformer, taking a relatively low voltage (e.g., a conventional 12-volt battery voltage of an automotive vehicle) and transforming it to a sufficiently high level to be applied to spark plug 30 so as to cause a spark across a spark gap thereof (e.g., such high voltage may be in the range of 15–30 kV). Transformer 12 comprises a centrally-disposed, relatively high magnetic permeability magnetic core 14, a primary coil 16, a secondary spool 18 wound with a secondary coil 20, a housing 22, a substantially rigid outer shell 24 and an interface 26. Core 14, primary coil 16, secondary spool 18 and secondary coil 20 are known generally in the art, and will not be described in any greater detail herein.

Housing 22 is configured to retain transformer 12, and is formed of electrically-insulating material.

Shell 24 may be formed of any suitable rigid material, such as steel or the like. As shown, shell 24 is formed of electrically conductive material, e.g., for grounding purposes.

Interface 26, in the illustrated embodiment, is configured to receive a corresponding mating connector for the input/output of electrical signals to and from a central controller, such as an engine control unit (ECU) or the like. Such signals may include an electronic spark timing (EST) signal (i.e., a dwell signal), a power signal, and a pressure signal. The latter two signals will be described in greater detail hereinafter.

With continued reference to FIG. 1, spark plug 30 is configured for mounting in a cylinder of an internal combustion engine (not shown), with a connection to a high-voltage (HV) spring 31. Spark plug 30 includes an electrically-conductive, centrally-disposed electrode 32 having a first, high-voltage end 34 and a second, opposing end 36. Spring 31 engages electrode 32, and a high-voltage (HV) terminal 33 from the secondary winding. Spark plug 30 further includes a conductive shell 38, which may be coupled to an electrical ground. Central electrode 32 and conductive shell 38 are separated by electrical insulating material, such as ceramic 39, as known in the art. The lowermost end 36 is spaced apart from a ground strap connected to shell 38 to define a spark gap therebetween.

In addition, FIG. 1 shows a pressure sensor 40 associated with plug 30 that is configured to detect a pressure in the cylinder and generate a corresponding pressure signal. Pressure sensor 40 may comprise a variety of technologies known to those of ordinary skill in the art including but not limited to piezoelectric devices, piezoresistive devices, and strain gauge devices. In the illustrated embodiment, pressure sensor 40 requires a power signal as an input, and provides a pressure signal as an output. The conventional approach for input/output of these signals is in the form of electrical leads or the like. A problem with this conventional approach as applied to an assembly 10, relates to the mechanism in which the upper portion of assembly 10 (i.e., that portion contained within housing 22) is coupled to the lower portion (i.e., that portion contained generally within annular shield 24). That is, the upper and lower portions may first be manufactured as subassemblies, but are then coupled together to form the final assembly 10. Using wires or other direct electrical connections, however, would be sensitive to the angular orientation of the upper portion relative to the lower portion. This sensitivity increases the difficulty of making the connection effectively. In accordance with the present invention, an electrical connection mechanism is provided that is essentially insensitive to the relative angular orientations of the upper portion of assembly 10 compared to the lower portion of assembly 10. Elimination of the above-described sensitivity eases manufacturing of the overall assembly 10.

FIG. 2A is a partial, section view showing, in greater detail, the inventive connection scheme shown in FIG. 1. As shown, pressure sensor 40 is electrically connected via electrical leads 52, 54 to an internal electronics portion 56. In the illustrated embodiment, leads 52 and 54 are configured to carry the power signal and the pressure signal to/from pressure sensor 40. Electronics 56 may comprise a printed circuit board (PCB). In an alternate embodiment, electronics 56 may comprise a multi-layer flex circuit board. A ground plane layer may be disposed adjacent a tube 58. In such alternate embodiment, electrical "leads" 52, 54 may be provided on subsequent, outer layers sandwiched between insulating layers of the multi-layer circuit board to connect electronics 56 to sensor 40.

FIG. 2A further shows a generally, annular electrically insulating tube 58 provided to isolate the pressure sensor signal/pressure sensor electronics 56 (and leads) from the relatively high voltage signal that is produced by transformer 12 and carried through the center of the assembly 10 via HV spring 31. In one embodiment, tube 58 comprises high dielectric thermoplastic material.

FIG. 2B further shows a first, generally annular ring connector 60, and a second, generally annular ring connector 62. Ring connectors 60, 62 are configured to receive the above-mentioned power and pressure signals. Ring connectors 60, 62 comprise electrically-conductive material such as steel. Further, each ring connector 60, 62 has a respective electrical connection (e.g., a wire) to electronics 56. In one embodiment, at least the lower, second ring 62 is configured with an interruption 63 in the circumference thereof to allow the electrical connection from the conductive ring 60 to reach electronics 56. Of course, other variations are possible (e.g., insert mold the electrical connections in tube 58 between the rings 60, 62 and electronics 56).

The rings 60, 62 provide a mechanism for electrical connection that is relatively insensitive to the angular orientation of the upper portion of assembly 10 relative to the lower portion of assembly 10, as described above. Ring connector 60, 62 provide a contact point for a corresponding pair of electrically conductive leaf spring members (described in greater detail below) that are insert molded in housing 22, and which ultimately terminate on the controller interface 26.

With continued reference to FIG. 2A, in addition, a seal 64 may be provided so that when the lower portion of assembly 10 (i.e., that which is shown in FIG. 2A) is mechanically coupled to the upper portion of assembly 10 (i.e., that which is contained within housing 22), a generally water and other element impervious seal may be made. Additionally, a boot 70 is included (omitted in FIG. 2A for clarity, but shown in FIGS. 4 and 5 for completeness) for providing electrical separation between the high-voltage to spark plug 30 and the pressure sense power and output signals. This is described in further detail in connection with FIGS. 4 and 5. As shown in FIG. 2A, seal 64 may contain one or more radially, outwardly projecting ribs. These ribs may bear on an inside diameter surface of housing 22. To enhance environmental immunity, an encapsulant 59 may be employed, filled up to the level "L" in FIG. 2A, which covers electronics 56 and the leads 52, 54 that couple pressure sensor 40 to electronics 56. This is an important feature of the present invention.

FIG. 3 is a top view of assembly 10 of FIG. 1. FIG. 3 will provide a frame of reference for subsequent FIGS. 4 and 5. As shown in FIG. 4, housing 22 includes a first electrically conductive leaf spring member 66, and as shown in FIG. 5, a second electrically conductive leaf spring member 68. Each leaf spring member 66, 68 is configured to resiliently engage a respective one of the first and second ring connectors 60 and 62, over a predetermined circumferential angle taken relative to main axis A. Through the foregoing, leaf spring member 66, 68 are configured to conduct pressure signal and the power signal to/from the interface 26, and electronics 56.

Referring now to FIG. 4 particularly, a partial, section view is shown of assembly 10 taken substantially along the line designated 4—4 in FIG. 3. FIG. 4 shows the first, electrically-conductive leaf spring member 66 in an engaged position with ring 60.

Referring now to FIG. 5 particularly a partial, section view is shown of assembly 10 taken substantially along the line designated 5—5 in FIG. 3. FIG. 5 shows the second, electrically-conductive leaf spring member 68 in an engaged position with ring 62.

Now with reference to FIGS. 3, 4, and 5, the first leaf spring member 66 engages the first annular ring connector 60 over a first predetermined circumferential angle relative to axis "A." The second electrically-conductive leaf spring member 68 engages the second annular ring connector 62 over a second predetermined circumferential angle relative to axis "A." In the illustrated embodiment, both the first and second predetermined angles are the same, and are substantially equal to the angle designated $\theta_3$ in FIG. 3, which is about 360°. In alternate embodiments, $\theta_3$ may be less than 360° since in such alternate embodiments, at least the lower ring connector 62 may contain a small break or interruption (best shown as interruption 63 shown in FIG. 2B) to allow a electrical lead or the like to pass through, or, alternatively, to allow some measure of flexure so that the rings can be "snapped" on the insulator tube 58.

Referring now to FIG. 3 particularly, the first leaf spring member 66 is disposed at a first angular position taken relative to axis x, the first angular position being designated $\theta_1$. Likewise, the second leaf spring member 68 is disposed at a second angular position, relative to the x-axis designated $\theta_2$. The second angular position $\theta_2$ is different from the first angular position $\theta_1$. This angular offset of the leaf spring members 66 and 68 serve to reduce interference when the upper portion of assembly 10 is connected to the lower portion of assembly 10.

In addition, leaf spring member 66 is axially (i.e., vertically) offset from second leaf spring member 68 to further reduce interference of the electrical connections. This vertical offset of the leaf spring correspond to the axially offset of the rings 60, 62, one relative to the other. This axial offset may be accomplished in a variety of ways including, but not limited to, varying the length of the leaf spring members, as well as simply varying the amount that each leaf spring member extends into the cavity where the ring connectors 60, 62 are located.

Leaf spring member 66, and 68 may be insert molded in housing 22. In such case, housing 22 may comprise thermoplastic material suitable for fabrication using a molding process.

During assembly, the upper portion of assembly 10 (i.e., that which is contained within housing 22) is slid onto the lower portion of assembly 10 (i.e., that which is contained within outer shield 24). Leaf spring members 66, 68 resiliently engage respective ring connectors 60, and 62. Significantly, the relative angular orientation of the upper portion of assembly 10 relative to the lower portion of assembly 10 is not as critical as would otherwise be using conventional connection approaches since each leaf spring ring connector pair are configured to engage one another over a predetermined angular (circumferential) range. As described above, such predetermined angular circumferential range can be made quite large, approaching or equal to 360°.

Assembly 10 may further include an electrically insulating coil boot 70, which acts to separate the relatively high voltage spark signal from the electrical signals used by pressure sensor 40. Boot 70 may comprise silicone material.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A spark plug coil and pressure sensor assembly for providing a spark to a cylinder of an internal combustion engine, said assembly comprising:
   a spark plug configured for mounting in said cylinder;
   a pressure sensor associated with said plug configured to detect a pressure in said cylinder and generate a pressure signal in response thereto;
   a first electrically conductive ring connector configured to receive said pressure signal; and
   a housing having a main axis and having at least one electrically conductive leaf spring member wherein said leaf spring member is configured to resiliently engage said first ring connector over a first predetermined angle relative to said main axis, said leaf spring member being further configured for conduction of at least said pressure signal to an interface.

2. The assembly of claim 1 further comprising a second ring connector for conduction of a power signal.

3. The assembly of claim 2 wherein said second ring connector is axially offset from said first ring connector.

4. The assembly of claim 2 wherein said leaf spring member is a first leaf spring member, said housing further including a second electrically conductive leaf spring member configured to resiliently engage said second ring connector over a second predetermined angle relative to said main axis, said second leaf spring member further configured for conduction of at least said power signal to said interface.

5. The assembly of claim 4 wherein said first leaf spring member is disposed at a first angular position and said second leaf spring member is disposed at a second angular position different from said first angular position to thereby reduce interference between first and second leaf spring members.

6. The assembly of claim 1 further comprising an electrically insulating boot secured to said housing.

7. The assembly of claim 1 wherein said electrically conductive leaf spring member comprises a resilient leg extending along said main axis of said housing and a portion of said leg is insert molded therein.

8. The assembly of claim 1 further comprising an annular seal secured by said housing for sealing an inner portion thereof.

9. The assembly of claim 2 further including electronics intermediate said pressure sensor and said first ring connector, said electronics being covered with an encapsulant.

10. The assembly of claim 1 further including leads configured to couple said pressure sensor to said electronics, said leads being covered by said encapsulant.

11. A spark plug coil and pressure sensor assembly for providing a spark to a cylinder of an internal combustion engine, said assembly comprising:
   a spark plug configured for mounting in said cylinder;
   a pressure sensor associated with said plug configured to detect a pressure in said cylinder and generate a pressure signal;
   a first electrically conductive ring connector coupled to receive said pressure signal;
   a second electrically conductive ring connector axially offset relative to said first ring connector and coupled to receive a power signal;
   an electronics circuit electrically intermediate said pressure sensor and said first and second ring connectors, leads configured to couple said pressure sensor to said electronics circuit, said electronics circuit and said leads being covered by encapsulant; and a housing having a main axis and having a first electrically conductive leaf spring member circumferentially offset from a second electrically conductive leaf spring member wherein said first and said second electrically conductive leaf spring members are configured to resiliently engage said first and said second ring connectors, respectively, over a predetermined angle relative to said main axis, said first electrically conductive leaf spring member being further configured for conduction of at least said pressure signal from said sensor to an interface.

12. The assembly of claim 11 wherein said first leaf spring member is disposed at a first angular position and said second leaf spring member is disposed at a second angular position different from said first angular position to thereby reduce interference between first and second leaf spring members.

13. The assembly of claim 11 wherein said second electrically conductive leaf spring member is further configured for conduction of at least said power signal from said interface to said sensor.

14. The assembly of claim 11 further comprising an electrically insulating boot secured to said housing.

15. The assembly of claim 11 wherein each of said first and said second electrically conductive leaf spring members comprise a respective resilient leg extending along said main axis of said coil housing and a portion of said leg is insert molded therein.

16. The assembly of claim 11 wherein said spark plug pressure assembly comprises an annular seal secured by said coil case for sealing an inner portion of said housing.

17. A glow plug and pressure sensor assembly for an internal combustion engine comprising:
 a glow plug for mounting in said cylinder;
 a pressure sensor associated with said plug configured to detect a pressure in said cylinder and generate a pressure signal in response thereto;
 a first electrically conductive ring connector configured to receive said pressure signal;
 an electronics circuit electrically intermediate said pressure sensor and said first ring connector, at least one lead configured to couple said pressure sensor to said electronics circuit, said electronics circuit and said at least one lead being covered by an encapsulant; and
 a housing having a main axis and having at least one electrically conductive leaf spring member wherein said leaf spring member is configured to resiliently engage said first ring connector over a first predetermined angle relative to said main axis, said leaf spring member being further configured for conduction of at least said pressure signal to an interface.

18. The assembly of claim 17 further comprising a second ring connector for conduction of a power signal.

19. The assembly of claim 18 wherein said second ring connector is axially offset from said first ring connector.

20. The assembly of claim 18 wherein said leaf spring member is a first leaf spring member, said housing further including a second electrically conductive leaf spring member configured to resiliently engage said second ring connector over a second predetermined angle relative to said main axis, said second leaf spring member further configured for conduction of at least said power signal to said interface.

21. The assembly of claim 20 wherein said first leaf spring member is disposed at a first angular position and said second leaf spring member is disposed at a second angular position different from said first angular position to thereby reduce interference between first and second leaf spring members.

22. The assembly of claim 17 further comprising an electrically insulating boot secured to said housing.

23. The assembly of claim 17 wherein said electrically conductive leaf spring member comprises a resilient leg extending along said main axis of said coil housing and a portion of said leg is insert molded therein.

24. The assembly of claim 17 further comprising an annular seal secured by said coil case for sealing an inner portion of said housing.

* * * * *